United States Patent
Pepper

[15] 3,650,549
[45] Mar. 21, 1972

[54] DRAIN, WASTE AND VENT EXPANSION JOINT

[72] Inventor: Kenneth V. Pepper, Davison, Mich.
[73] Assignee: Esso Research and Engineering Company
[22] Filed: June 18, 1970
[21] Appl. No.: 47,340

[52] U.S. Cl. ..................285/27, 285/93, 285/169, 285/302, 285/369, 285/DIG. 16
[51] Int. Cl. ..........................F16l 47/02
[58] Field of Search............285/93, 302, 423, 27, DIG. 16, 285/169, 369

[56] References Cited

UNITED STATES PATENTS

| 2,956,819 | 10/1960 | Sies | 285/93 |
| 1,558,592 | 10/1925 | Chester | 285/302 X |
| 1,204,728 | 11/1916 | Arena | 285/302 |
| 3,245,701 | 4/1966 | Leopold, Sr. et al | 285/423 X |
| 2,946,156 | 7/1960 | Bailey | 285/93 X |

FOREIGN PATENTS OR APPLICATIONS

| 705,280 | 3/1965 | Canada | 285/93 |
| 651,887 | 1/1963 | Italy | 285/93 |
| 867,989 | 5/1961 | Great Britain | 285/302 |

Primary Examiner—Thomas F. Callaghan
Attorney—Chasan and Sinnock and Charles A. Cohen

[57] ABSTRACT

A drain, waste and vent pipe expansion joint or connector for use with plastic pipe is provided with (1) a thermal guide for proper positioning of a mating pipe at installation temperature to allow for linear expansion or contraction of the pipe, (2) a transparent window for visual inspection of the completed assembly, and (3) a positive means for sealing the connection so as to prevent leakage of gas or liquid wastes.

1 Claims, 3 Drawing Figures

Patented March 21, 1972
3,650,549
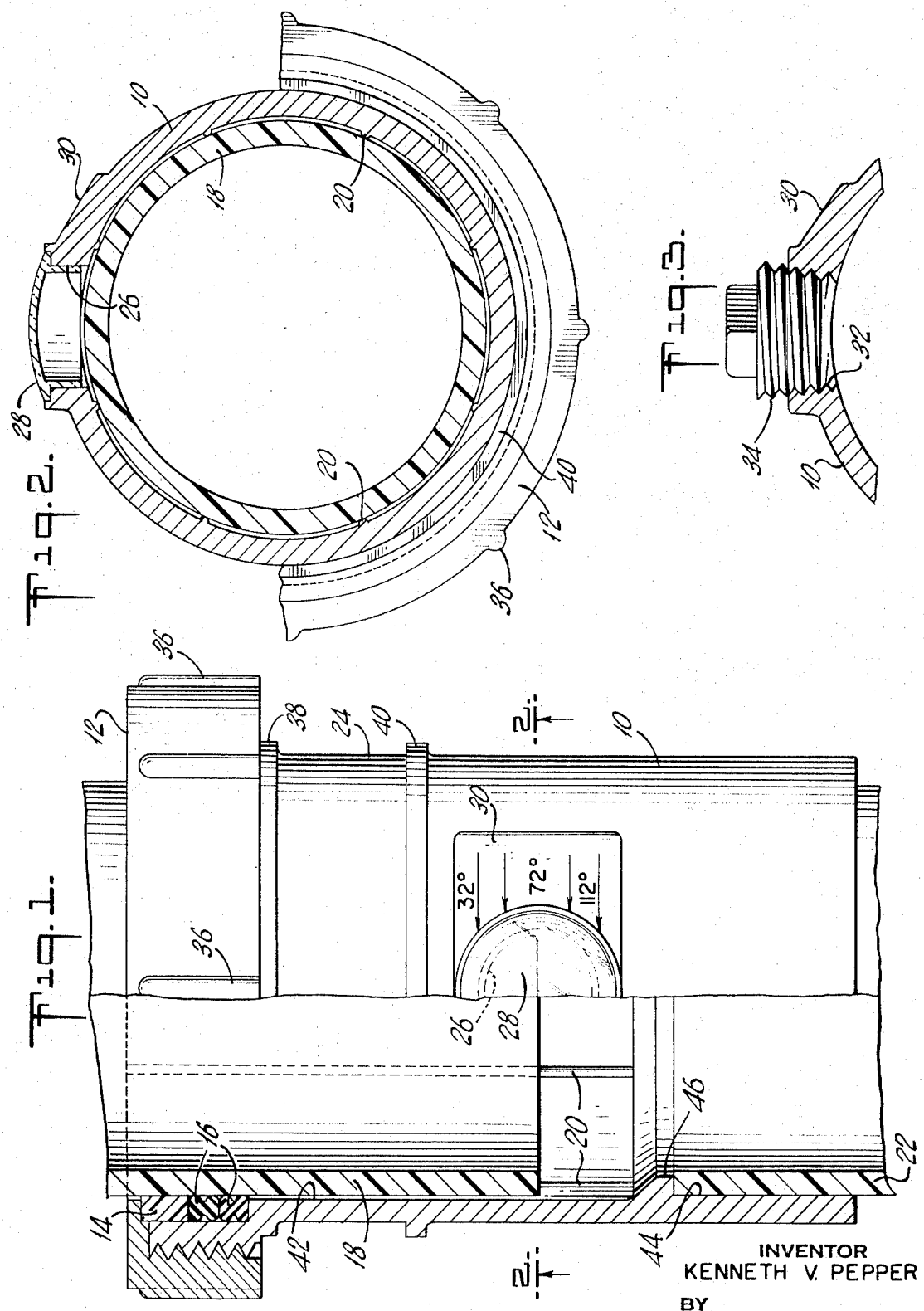
INVENTOR
KENNETH V. PEPPER
BY
Charles A. Cohen
AGENT

3,650,549

DRAIN, WASTE AND VENT EXPANSION JOINT

BACKGROUND AND FIELD OF THE INVENTION

This invention is concerned with expansion joints or connectors particularly adapted for use with drain, waste and vent (DWV) pipe fabricated from thermoplastic or other resinous compositions. Building codes in the past have specified the use of heavy cast-iron bell and spigot or hub pipes for drain and waste pipes, joined and sealed by oakum caulking topped by poured lead. Vent lines have traditionally been made from standard weight galvanized wrought iron or steel pipe.

More recently, building codes have permitted the use of certain types of plastic pipe and fittings for DWV service since these plastics are light in weight, are virtually insensitive to ordinary household wastes, multiple joints at four to five foot intervals with attendant opportunities for leakage and blockage are avoided, the smooth, glass-like bore permits clean flushing of wastes and installation of pipe and fittings is rapid using either solvent welding, self-curing cements or thermal fusion.

One of the problems encountered with the use of plastic or nonmetallic pipe has been the higher coefficient of thermal expansion of plastics compared to iron and steel. Plastics commonly used for DWV service such as rigid PVC (polyvinyl chloride) and ABS (acrylonitrile-butadiene-styrene) have coefficients of thermal expansion in the range of $5-20 \times 10^{-5}$ cm./cm./° C. which is an order of magnitude higher than iron which is in the range of $5-7 \times 10^{-6}$ cm./cm./° C. For example, a 30 foot length of rigid PVC pipe, made from an alloy of PVC and a minor proportion of ABS, with a coefficient of linear expansion of $3 \times 10^{-5}$ in./in./° F., will lengthen or contract 1.08 inches if the temperature is raised or lowered 100° F.

Difficulties with prior art expansion joints have been most acute in northern latitudes where temperatures seasonally may drop below 0° F. causing sufficient shrinkage to permit escape of gas or objectionable material or where drain lines which may carry water as high as 160° F. expand in length and either buckle or "bottom out" in the joint and cause fracture.

Based on a recognition of these problems, present building codes limit the stack height of plastic DWV pipe in single family dwellings to 35 feet and require at least one expansion joint to be included in an area accessible to inspection, usually the basement. Under special approval, plastic DWV pipe may be used in multiple dwelling, high-rise apartments with the provision that an expansion joint be included in the stack at each floor level. In either case it is essential to use an expansion joint which may be readily inspected for proper makeup, since the plastics from which the pipe and fittings are made are usually opaque, correct fitting cannot be determined by external examination of the completed assembly, and when completed is often buried in a partition.

SUMMARY OF INVENTION

The present invention discloses an expansion joint which offers many advantages over the expansion joints which have been used and disclosed in the prior art. The joint provides for: accurate placement of the end of the pipe engaging the joint at the ambient temperature prevailing at the time of installation, means for visual inspection of the completed joint by the building or plumbing inspector after the installation is complete of a pipe-stack which is normally fabricated from opaque materials, and a gas and liquid tight stuffing-box seal which permits lineal expansion or contraction of the pipe-stack over a wide range of temperature.

DESCRIPTION OF DRAWINGS

FIG. 1 is a sectional view in elevation showing the expansion joint 10, consisting of an upper threaded bell portion 42 and lower socket portion 44 separated by internal collar 46, assembled with an upper longitudinally movable pipe 18 and fixed pipe 22. The socket 44 is rigidly joined to pipe 22 by means of threads for those thickness of pipe having sufficient stock such as schedule 40 pipe or alternatively joined by the following procedures, depending on the nature of the plastic or resin. An interference fit is first assured between the socket and pipe followed by: solvent welding in the case of PVC and ABS pipe; thermal fusion in the case of polyolefin pipe and fittings such as high density polyethylene, polypropylene and the like and epoxy or silicone cements and adhesives in the case of glass reinforced polyester or epoxy pipe and fittings.

A plurality of half-round vertical guides 20 disposed around the inner periphery of the bell 42 ensure a slidable fit with the longitudinally movable pipe 18 and prevent surface contact and seizure. The bell and pipe 18 are sealed against gas and fluid leakage by means of a stuffing box consisting of packing 16 compressed and held in place by gland 14 and nut 12. Packing 16 may comprise extruded thermoplastic, resinous or elastomeric compositions having low coefficients of friction such as plasticized polyvinyl chloride, butyl rubber, EPDM rubbers, sulfochlorinated polyolefins, polytetrafluoroethylenes and the like or may comprise fibrous compositions such as asbestos, jute, hemp and the like impregnated with graphite, silicone greases and the like. Extrusions may have dumbbell cross sections as illustrated or may have square or chevron cross sections. Ends should be cut on an angle and should overlap. Gland 14 is of the split-ring type and may be made from the same resinous composition as used for the body of the expansion joint or a different resin or plastic may be used. Threaded nut 12 is molded with a plurality of circumferentially disposed lugs 36 to assist in hand tightening the nut. While V-threads are illustrated, other thread forms such as Whitworth, Square, Acme, Buttress and the like may be used.

In use, the expansion joint is rigidly attached to the framework of the building by means of a strap and saddle (not shown) which encircle the joint at ferrule 24 defined by hubs 38 and 40. The upper end of mating pipe 18 is rigidly fixed against longitudinal movement so that expansion or contraction must take place within the space defined by packing 16 and internal collar 46.

In order to ensure proper placement of the lower end of pipe 18 within the bell 42 at the ambient temperature prevailing at the time of installation, a transparent window 28, molded or fitted into recess 26 which is in communication with the interior of bell 42, is provided with temperature indicia molded or engraved on boss 30 at a point intermediate collar 46 and packing 16. The window may be circular as illustrated in FIGS. 1 and 2 or may have the configuration of an elongated slot with semicircular ends. Suitable resins for fabricating the window may be polystyrene, polyphenyl carbonates, polymethylmethacrylates and the like. Alternatively, visual and tactile inspection may be afforded by a threaded port 32, which can be sealed by means of a threaded tapered plug 34, as shown in FIG. 3. In the latter case, the inspector after determining satisfactory placement may seal the plug with solvent or cement; and the entire system subjected to a hydrostatic test to determine freedom from leakage.

The expansion joint of this invention provides the installer with a precise means for placement of the pipe at the time and temperature of installation and allows for independent verification by the plumbing or building inspector.

Having fully and operably described my invention in a preferred embodiment, I claim:

1. An expansion joint for plastic pipe comprising:
    a. a tubular body having a first socket portion at one end for fixed attachment to a plastic pipe, an internal collar adjacent said socket portion, a bell portion adjacent said internal collar and spaced inwardly from said first socket portion, and having disposed around its inner periphery a plurality of parallel guides for assisting in positioning plastic pipe within said body, and at the other end of said tubular body a second socket portion for accepting resilient packing, the exterior surface of said body located radially outwardly from said second socket portion being threaded to receive a tightening nut;
    b. a gland ring disposed outwardly of said resilient packing within said second socket portion;

c. a threaded tightening nut concentric with said body in operable engagement with the external threads on said body for urging said gland ring into operative contact with said packing by tightening;

d. a window in said bell portion for visually locating the end of a plastic pipe inserted into said bell portion; and e. temperature indicia located on the exterior of said body directly adjacent said window to assist the proper positioning of said pipe in said body.

* * * * *